United States Patent
Ryu et al.

(10) Patent No.: US 9,272,617 B2
(45) Date of Patent: Mar. 1, 2016

(54) ANTI-MISFUELING FILLER NECK DEVICE

(71) Applicant: Hyundai Motor Company, Seoul (KR)

(72) Inventors: Bu Yeol Ryu, Hwaseong-si (KR);
Myeong Hwan Kim, Hwaseong-si (KR); Bo Sung Lee, Daejeon (KR)

(73) Assignee: Hyundai Motor Company, Seoul (KR)

( * ) Notice: Subject to any disclaimer, the term of this patent is extended or adjusted under 35 U.S.C. 154(b) by 141 days.

(21) Appl. No.: 14/094,383

(22) Filed: Dec. 2, 2013

(65) Prior Publication Data

US 2014/0332529 A1 Nov. 13, 2014

(30) Foreign Application Priority Data

May 8, 2013 (KR) .................. 10-2013-0051609

(51) Int. Cl.
*B60K 15/04* (2006.01)

(52) U.S. Cl.
CPC ......... *B60K 15/04* (2013.01); *B60K 2015/0458* (2013.01); *B60K 2015/0461* (2013.01); *B60K 2015/0483* (2013.01)

(58) Field of Classification Search
CPC .............. B60K 2015/0458; B60K 2015/0461; B60K 2015/0483
USPC ................................. 141/348–350
See application file for complete search history.

(56) References Cited

U.S. PATENT DOCUMENTS

| 3,730,216 | A * | 5/1973 | Arnett et al. ................. 137/588 |
| 7,293,586 | B2 | 11/2007 | Groom et al. |
| 7,621,303 | B2 * | 11/2009 | Buchgraber ................ 141/350 |
| 7,661,550 | B2 * | 2/2010 | Feichtinger ................ 220/86.2 |
| 7,665,493 | B2 * | 2/2010 | Groom et al. ................ 141/350 |
| 7,967,041 | B2 * | 6/2011 | Groom et al. ................ 141/367 |
| 7,967,042 | B2 * | 6/2011 | Groom et al. ................ 141/367 |
| 8,714,214 | B2 * | 5/2014 | Cisternino ................ 141/350 |
| 8,763,656 | B2 * | 7/2014 | Ichimaru et al. ............. 141/350 |
| 8,899,285 | B2 * | 12/2014 | Hagano ..................... 141/350 |
| 8,910,678 | B2 * | 12/2014 | Cisternino et al. ........... 141/350 |
| 2006/0289084 | A1 * | 12/2006 | Groom et al. ................ 141/367 |
| 2007/0034287 | A1 * | 2/2007 | Groom et al. ................ 141/350 |
| 2008/0092986 | A1 * | 4/2008 | Buchgraber ................ 141/350 |
| 2008/0308180 | A1 * | 12/2008 | Baudoux et al. ............. 141/349 |
| 2009/0020182 | A1 * | 1/2009 | Groom et al. ................ 141/349 |
| 2010/0006178 | A1 * | 1/2010 | Muth et al. .................. 141/350 |
| 2010/0132838 | A1 | 6/2010 | Cisternino et al. |
| 2010/0175785 | A1 * | 7/2010 | Groom et al. ................ 141/350 |
| 2010/0218849 | A1 * | 9/2010 | Hagano ..................... 141/350 |
| 2011/0315682 | A1 * | 12/2011 | Tsiberidis ................. 220/86.2 |

FOREIGN PATENT DOCUMENTS

| KR | 20-0379665 Y1 | 3/2005 |
| KR | 10-0535510 B1 | 12/2005 |
| KR | 10-2009-0114949 A | 11/2009 |
| WO | WO 2009/144475 A1 | 12/2009 |

* cited by examiner

*Primary Examiner* — Nicolas A Arnett
(74) *Attorney, Agent, or Firm* — Morgan, Lewis & Bockius LLP

(57) ABSTRACT

An anti-misfueling filler neck device includes sliding projections mounted at the bottom of a housing to move laterally to allow a flapper to be opened only when a fuel gun for a diesel vehicle is inserted, thus preventing gasoline from being injected into the diesel vehicle.

14 Claims, 7 Drawing Sheets

ANTI-MISFUELING FILLER NECK DEVICE

CROSS-REFERENCE TO RELATED APPLICATION

The present application claims priority of Korean Patent Application Number 10-2013-0051609 filed May 8, 2013, the entire contents of which application is incorporated herein for all purposes by this reference.

BACKGROUND OF INVENTION

1. Field of Invention

The present invention relates to a filler neck device. More particularly, it relates to an anti-misfueling filler neck device with a sliding structure.

2. Description of Related Art

In general, a fuel tank for storing a fuel necessary for engine combustion is provided in a vehicle. The fuel tank is connected to a fuel pipe and a fuel filler neck, which represents a fuel inlet, is provided at an end of the fuel pipe, thus supplying fuel.

The diameter of a fuel gun for injecting fuel into the fuel filler neck differs depending on the type of fuel (gasoline or diesel), and the speed of fueling also differs.

Typically, the diameter of the fuel gun for injecting diesel fuel is greater than that of the fuel gun for injecting gasoline fuel.

Therefore, the diameter of the fuel inlet of a diesel vehicle is greater than that of the fuel inlet of a gasoline vehicle to fit the diameters of the fuel guns for the diesel and gasoline vehicles.

Conventionally, diesel fuel has been mainly used for large vehicles. However, in recent years, diesel-fueled vehicles have become more common, and the number of self-service stations is increasing due to high oil prices.

Meanwhile, due to the difference in the diameter of the fuel gun and the fuel inlet depending on the types of fuels used in the gasoline and diesel vehicles, the fuel gun for the diesel vehicle cannot be inserted into the fuel inlet of the gasoline vehicle, but the fuel gun for the diesel vehicle can be inserted into the fuel inlet of the diesel vehicle, which may cause gasoline fuel to be supplied to the diesel vehicle due to misfueling.

In this case, if the engine is operated while the gasoline fuel is introduced in a fuel system of the diesel vehicle, the engine stalls during operation, which causes the vehicle to suddenly stop, resulting in mechanical wear due to the gasoline fuel. Therefore, when the engine stalls during operation, it is necessary to replace fuel-related parts with new ones, which is very problematic.

The information disclosed in this Background section is only for enhancement of understanding of the general background of the invention and should not be taken as an acknowledgement or any form of suggestion that this information forms the prior art already known to a person skilled in the art.

BRIEF SUMMARY

Various aspects of the present invention provide for an anti-misfueling filler neck device, in which sliding projections, which are mounted at the bottom of a housing so as to move laterally, are used to allow a flapper to be opened only when a fuel gun for a diesel vehicle is inserted, thus preventing gasoline from being injected into the diesel vehicle.

Various aspects of the present invention provide for an anti-misfueling filler neck device configured to prevent different types of fuel from being supplied, the anti-misfueling filler neck device including: a housing into which a fuel gun is inserted; sliding projections which are mounted at the bottom of the housing so as to slide laterally and face each other; springs which connect the sliding projections horizontally to elastically support the sliding projections; a stopper which is in the form of a locking groove and formed on one of the sliding projections; and a flapper which has a hinge structure and is rotatably mounted on the other sliding projection to open and close a lower opening of the housing, wherein when a fuel gun having a relatively small diameter is inserted while the flapper is locked and closed by the locking groove of the stopper, the sliding projections are tightened by the springs such that the flapper is maintained in the closed state, and when a fuel gun having a relatively large diameter is inserted, the sliding projections are opened more widely than the length of the flapper such that the flapper is released from the stopper and opened.

The flapper may be rotated to its original position by a torsion spring and is opened only when a diesel fuel gun is inserted.

The stopper in the form of a locking groove with a C-shaped cross-section may be formed on a lower end of the sliding projection and a tapered portion is formed to be inclined downwardly from an inlet end of the stopper such that the flapper is rotated to its original position and inserted and locked into the stopper.

The sliding projection may include horizontal wing portions, which are formed in parallel to project laterally from both sides of the sling projection, the horizontal wing portions being inserted into guide grooves formed horizontally on the side of the housing to guide the horizontal movement of the sliding projection.

The horizontal wing portions of the sling projection may have flat upper and lower surfaces and are prevented from being rotated when they are moved along the guide grooves of the housing.

The housing may include side plates which are formed in parallel to project laterally from both sides of the bottom of the housing and the guide grooves which are formed horizontally on the side plates, thus guiding the horizontal movement of the sliding projections.

The sliding projection may include a sliding portion which has a substantially right-angled triangular cross-section on the top of the sliding projection and has a round edge which is in contact with the fuel gun such that the interval between the sliding projections is minimized even when the fuel gun is inserted obliquely, thus preventing the flapper from being released from the locking groove of the stopper.

The housing may include semi-circular plate springs which are arranged axially on the inside of the housing, thus preventing the flapper from being opened when the fuel gun is inserted obliquely.

The housing may include an inlet portion which has a diameter that increases toward the top of the housing and is formed at an upper end of the housing, and thus the housing has an integrated structure with a retainer.

One side of the inlet portion of the housing may be biased from the central axis of the housing and may have a large opening area, and an air vent hole may be formed on one side the biased inlet portion, thus easily discharging air to the outside during fueling.

The housing may include a position regulation groove which is formed on one side of an upper edge of the housing, thereby preventing misassembling of the housing.

The anti-misfueling filler neck device may further include a case including a fuel inlet, which is installed on a vehicle body and into which the fuel gun is installed, and a fuel pipe which is detachably connected to a lower end of the fuel inlet, wherein the housing is supported between a flange portion formed at a lower end of the fuel inlet and a flange portion formed at an upper end of the fuel pipe using a side support plate which is formed to project from the side of the housing.

The rear side of the sliding projection is in the form of a circular curved shape with a constant curvature so as to minimize the size of the case which surrounds the housing, the sliding projections, and the flapper.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
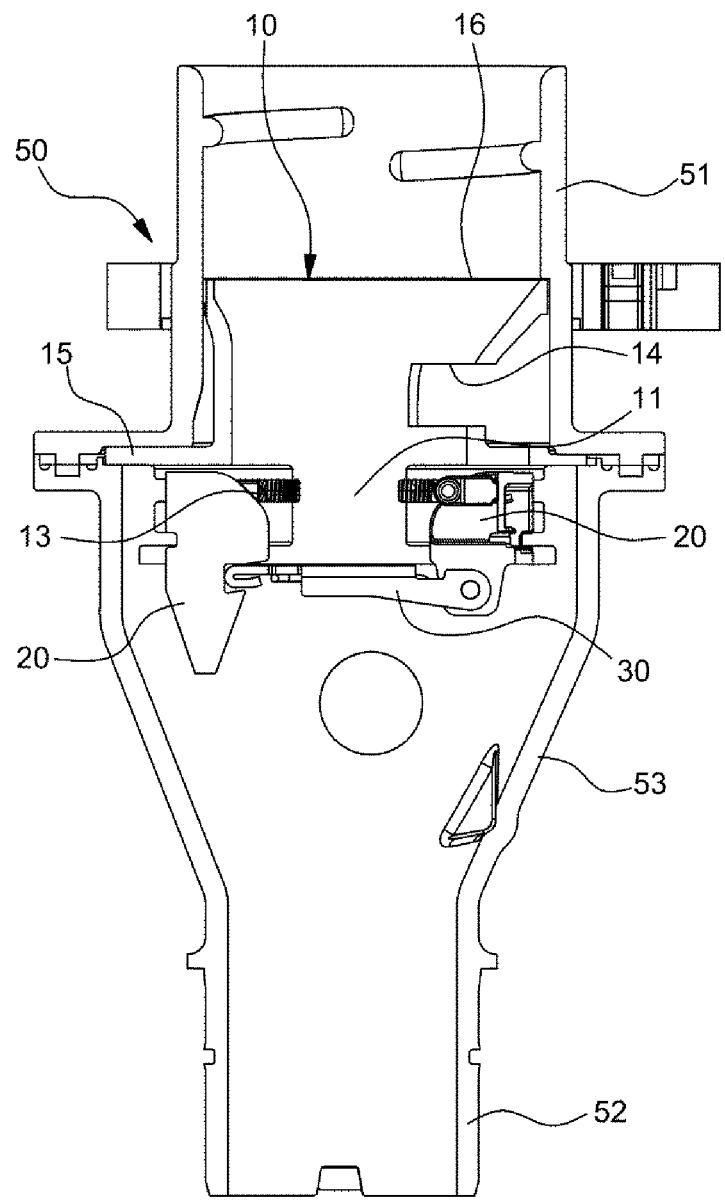
FIG. 1 is a cross-sectional view of an exemplary anti-misfueling filler neck device in accordance with the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Figure 2:
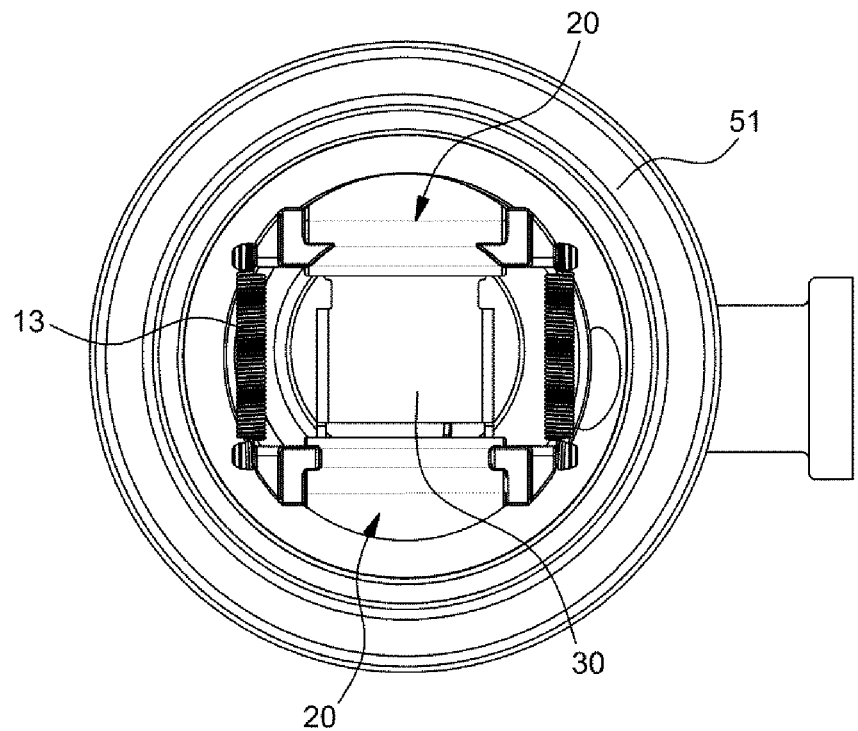
FIG. 2 is a plan view of the filler neck device of FIG. 1.
Figure 3:
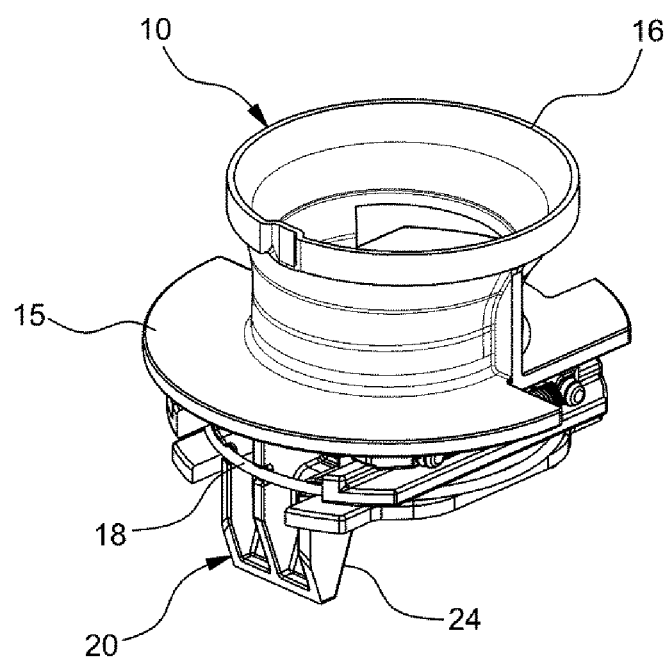
FIG. 3 is a perspective view showing the internal structure of a filler neck of FIG. 1.
Figure 4:
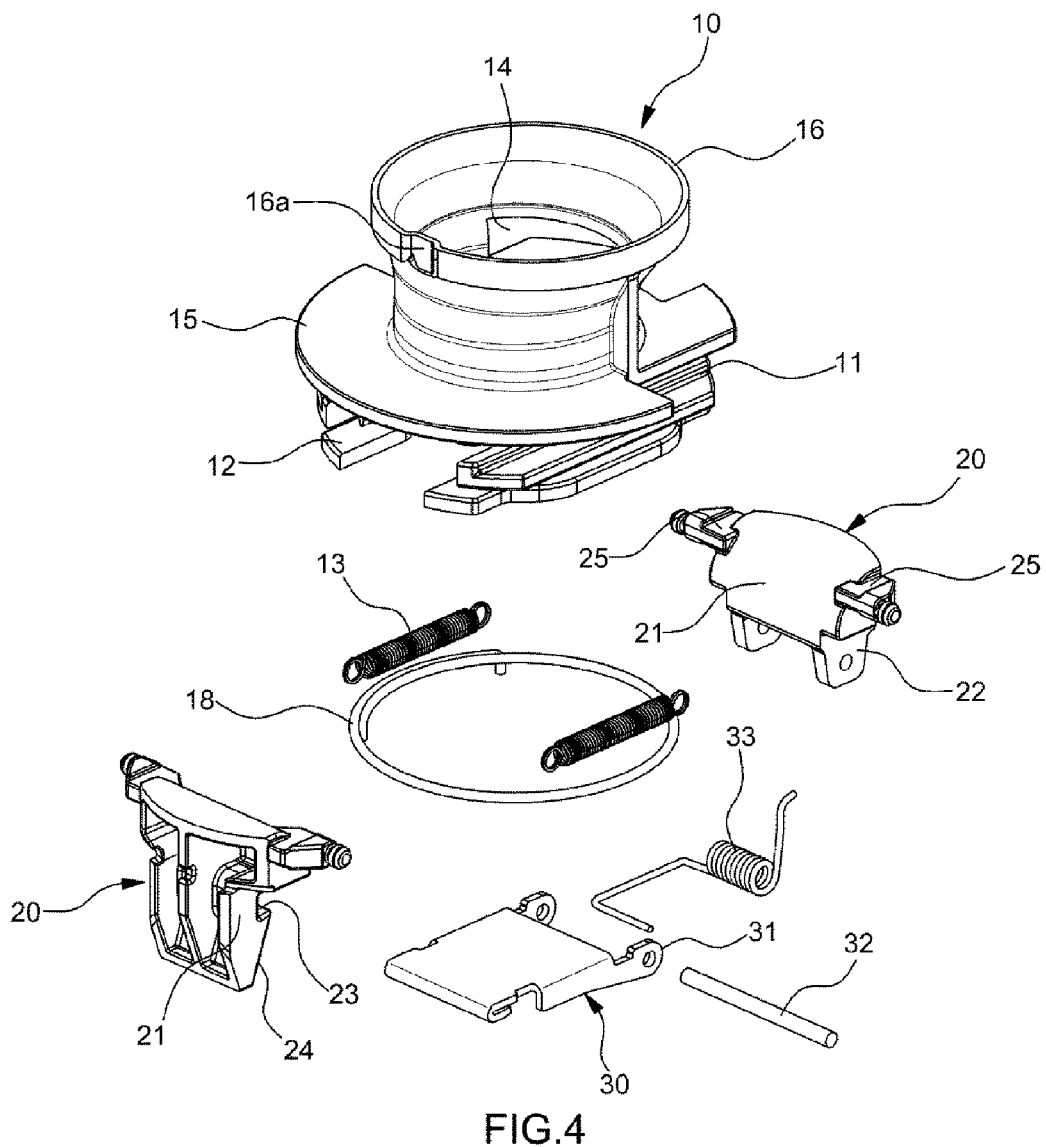
FIG. 4 is an exploded view of the filler neck device of FIG. 1.
Figure 5:
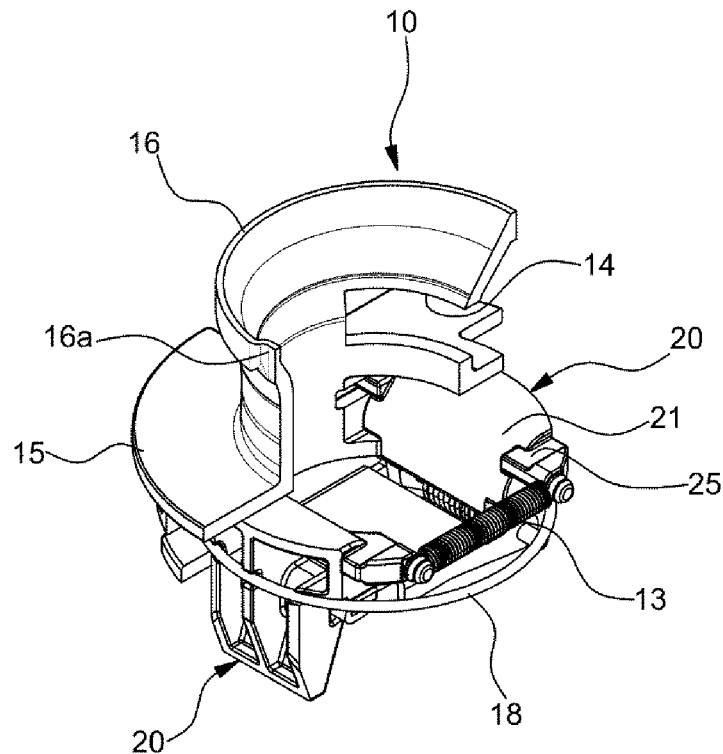
FIG. 5 is a partially cut-way view of the filler neck device of FIG. 3.

FIG. 1 is a cross-sectional view of an anti-misfueling filler neck device in accordance with various embodiments of the present invention, FIG. 2 is a plan view of FIG. 1, FIG. 3 is a perspective view showing the internal structure of a filler neck of FIG. 1, FIG. 4 is an exploded view of FIG. 1, and FIG. 5 is a partially cut-way view of FIG. 3.

The present invention relates to an anti-misfueling filler neck device configured to prevent a gasoline pump nozzle or fuel gun 40 from injecting gasoline into a fuel inlet 51 of a diesel vehicle.

The anti-misfueling filler neck device according to the present invention can be applied to a diesel vehicle with a fuel inlet having a relatively large diameter to fit a diesel fuel gun 41 and allows a flapper 30 to be opened only when the diesel fuel gun 41 is inserted using sliding projections 20 which can move linearly in a lateral direction, thus preventing gasoline from being supplied to the diesel vehicle.

To this end, the anti-misfueling filler neck device of the present invention comprises a case 50, a housing 10 which is installed within the case 50, sliding projections 20 which can move linearly in a lateral direction at a lower portion of the housing 10, and a flapper 30 which is openable and installed at a lower end of the sliding projections 20.

The case 50 comprises a fuel inlet 51 which is located at the top of the case 50 and into which a fuel gun is inserted and a fuel pipe 52 which is located at the bottom of the case 50 and connected to a fuel tank.

The fuel inlet 51 and the fuel pipe 52 have a circular pipe shape, and a flange portion is formed to extend radially at a lower end of the fuel inlet 51 and an upper end of the fuel pipe 52, respectively. Moreover, a connection means, for example, a bolt and a nut or a concave-convex structure of a projection and a groove may be employed in the flange portions, respectively, to connect the fuel inlet 51 and the fuel pipe 52.

An enlarged-pipe portion 53 with a conical shape whose diameter increases toward the top is formed at the upper end of the fuel pipe 52, and the sliding projections 20 are accommodated in the enlarged-pipe portion 53.

The fuel pipe 52 connects between the fuel tank and the fuel inlet 51 to deliver fuel from the fuel inlet 51 to the fuel tank when the fuel is supplied through the fuel inlet 51 using a fuel gun.

The housing 10 has a circular pipe shape, which thus allows a circular fuel gun 41 to be inserted into the pipe. Here, the pipe should have an internal diameter large enough to insert fuel guns for diesel passenger vehicles and commercial diesel vehicles as well as gasoline vehicles.

The upper portion of the housing 10 is located inside the fuel inlet 51, and the lower portion of the housing 10 is located inside the enlarged-pipe portion 53 of the fuel pipe 52. Moreover, the housing 10 has a side support plate 15 which projects laterally in the middle of the housing 10. Thus, the side support plate 15 is inserted and supported between the flange portion at the upper end of the fuel pipe 52 and the flange portion at the lower end of the fuel inlet 51.

An inlet portion 16 with a diameter greater than that of the housing body is formed at the top of the housing 10. The inlet portion 16 corresponds to an existing retainer and has a structure in which the existing retainer is integrated with the housing 10, which reduces the number of parts and assembling processes, thus reducing manufacturing costs.

The inlet portion 16 serves to guide the fuel gun 41 to be easily inserted into the housing 10. One side of the inlet portion 16 is biased from the center and has a large surface area, and an air vent hole 14 is formed on the inlet portion 16 to discharge air to the outside during fueling, thus facilitating the fueling.

Moreover, a position regulation groove 16a is formed on one side of an upper edge of the inlet portion 16, and a position regulation projection is formed on one side of the inside of the fuel inlet 51. Thus, the housing 10 is assembled to the case 50 in such a manner that the position regulation projection is inserted into the position regulation groove 16a when the housing 10 is inserted into the case 50, thus preventing misassembling.

Here, the sliding projections 20 and the flapper 30 being assembled to the bottom of the housing 10 can be installed between the flange portions of the fuel inlet 51 and the fuel pipe 52 using the side support plate 15 of the housing 10.

Moreover, openings are formed on the left and right sides of the bottom of the housing 10 such that the sliding projections 20 can be inserted into the housing 10 through the openings.

In order to guide the sliding projections 20 to move linearly in the lateral direction, side plates 11 are formed in parallel at regular intervals and project from the bottom of the side support plate 15 of the housing 10, and a guide groove 11a is formed horizontally on each side plate 11.

The guide grooves 11a accommodate horizontal wing portions 25 formed on both sides of the sliding projection 20 and guide the linear movement of the sliding projection 20.

Moreover, side support projections 12 are formed horizontally at lower ends of the side plates 11 to project inwardly, thus slidably supporting the both sides of the sliding projection 20.

The sliding projections 20 are mounted in the housing 10 to linearly move in the lateral direction through the openings formed on the left and right sides of the housing 10.

The sliding projection 20 comprises a sliding portion 21 which has a substantially right-angled triangular cross-section, projection portions 22 which project downwardly from the bottom of the sliding portion 21, and the horizontal wing portions 25 which project laterally from both sides of the sliding portion 21.

A pair of sliding projections 20 are arranged laterally with the housing 10 interposed therebetween in such a manner that inclined surfaces of the sliding portions 21 face each other, and the horizontal wing portions 25 of the sliding projection 20 are inserted into the guide grooves 11a formed on the side plates 11 of the housing, thus laterally moving the sliding projections 20.

The edge at the lower end of the inclined surface of the sliding portion 21 of the sliding projection 20, in particular, the edge of the sliding projection 20, which meets the outer surface of the fuel gun, is formed into a round shape such that a stopper 23 is not opened even when the gasoline fuel gun 40 is inserted obliquely.

Here, the sliding portion 21 of the sliding projection 20 is in the form of a straight line when viewed from the top, and thus even when the fuel gun inserted into the housing 10 moves up and down, the sliding projection 20 move laterally in a consistent manner.

The horizontal wing portions 25 have a rectangular cross-sectional shape and flat upper and lower surfaces. Thus, the horizontal wing portions 25 do not rotate along the guide grooves 11a but are slidably movable.

Moreover, springs 13 are connected laterally to the horizontal wing portions 25 of the sliding projections 20 using circular fastening projections so as to elastically support the sliding projections 20 such that the sliding projections 20 become close to each other by the elasticity of the springs 13.

Furthermore, an elastic ring 18 is provided on the sliding projections 20 and the housing 10 in a manner so as to surround the rear sides of the sliding projections 20, which face each other at regular intervals, and the lower outer surface of the housing 10. Therefore, when the fuel gun 41 is inserted into one of upper, lower, left and right sides (based on the plan view as viewed from the top of the housing 10) and removed to the outside, the sliding projections 20 are not biased laterally but aligned in the center (in its position) of the housing 10 by the elastic restoring force of the elastic ring 18.

That is, the elastic ring 18 has both ends which are separated from each other and is fixed in a manner so as to surround the rear sides of the sliding projections 20 (i.e., the elastic ring 18 is fixed to fixing grooves formed on the rear sides of the sliding projections 20) and the lower outer surface of the housing 10. Therefore, as the sliding projections 20 are opened to both sides by the insertion force of the fuel gun, both ends of the elastic ring 18 are opened in both directions. Then, when the insertion force of the fuel gun is cancelled, the elastic ring 18 fixed in a manner so as to surrounding the lower outer surface of the housing 10 allows the sliding projections 20 to be aligned in the center of the housing 10.

A stopper 23 in the form of a locking groove with a C-shaped cross-section is formed on the projection portion 22 of one of the sliding projections 20 facing each other such that the flapper 30 is locked by the C-shaped cross-sectional locking groove, thus regulating the upper and lower rotation.

The flapper 30 has a hinge structure and is rotatably provided on the lower ends of the sliding projections 20 facing each other to open and close a lower opening of the housing 10.

For example, a hinge shaft 32 is provided on the projection portion 22 of the other sliding projection 20, and a hinge portion 31 formed on one end of the flapper 30 is hinge-connected by the hinge shaft 32 such that the other end of the flapper 30 rotates, thus opening and closing the lower end of the housing 10.

Moreover, a torsion spring 33 is provided on the hinge shaft 32 in such a manner that one end of the torsion spring 33 is fixed to the flapper 30 and the other end of the torsion spring 33 is fixed to the projection portion 22 of the sliding projection 20, thus elastically supporting the flapper 30 in a direction that the flapper 30 is closed using the elasticity of the torsion spring 33.

A tapered portion 24 is formed at a lower end of the projection portion 22 of the sliding projection 20 to be inclined downwardly from an inlet end of the stopper 23, and thus when the other end of the flapper 30 rotates in a closed direction, the flapper 30 can be easily inserted into the stopper 23.

Furthermore, the rear side of the sliding portion 20 (with respect to the movement direction of the sliding projection 20) is in the form of a circular curved shape with a constant curvature. Therefore, when the sliding projections 20 move laterally (in an opened direction) in the housing 10, it is possible to maintain a regular interval with respect to the inner side of the circular fuel pipe 52, thus minimizing the diameter of the enlarged-pipe portion 53 of the fuel pipe 52, i.e., reducing the size (volume) of the fuel pipe 52.

The operation of the above-described anti-misfueling filler neck device using the sliding projections 20 according to the present invention will be described below.

Figure 6:
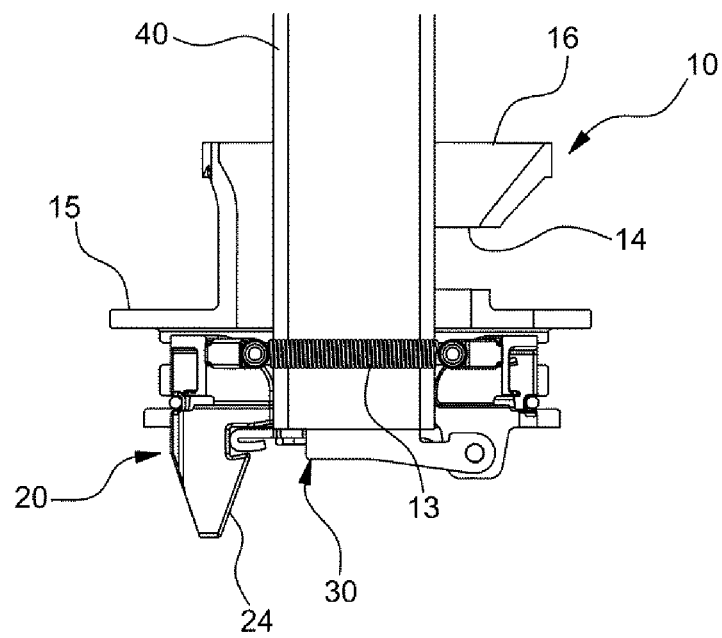
FIG. 6 is a cross-sectional view showing a state in which a gasoline fuel gun is inserted into the center of a housing in the cross-sectional view of FIG. 3.

FIG. 6 is a cross-sectional view showing a state in which a gasoline fuel gun is inserted into the center of a housing in the cross-sectional view of FIG. 3.

(1) When the gasoline fuel gun 40 is inserted into the center of the housing 10, if the lower end of the fuel gun presses down the inclined surfaces of the sliding portions 21 of the sliding projections 20, the sliding projections 20 slide laterally and are opened, and the fuel gun passes through the sliding portions 21 and reaches the flapper 30.

At this time, the sliding portions 21 of the sliding projections 20 are maintained at the same interval as the outer diameter of the fuel gun by the elastic restoring force of the springs 13, which connect the sliding projections 20, and tightened in contact with the outer surface of the fuel gun.

Therefore, the flapper 30 is being locked by the stopper 23 of the sliding projection 20 to open and close the lower end of the housing 10, thus preventing gasoline from being mixed with diesel, which is caused when the gasoline fuel gun 40 is inserted into a fuel filler neck of the diesel vehicle.

Figure 7:
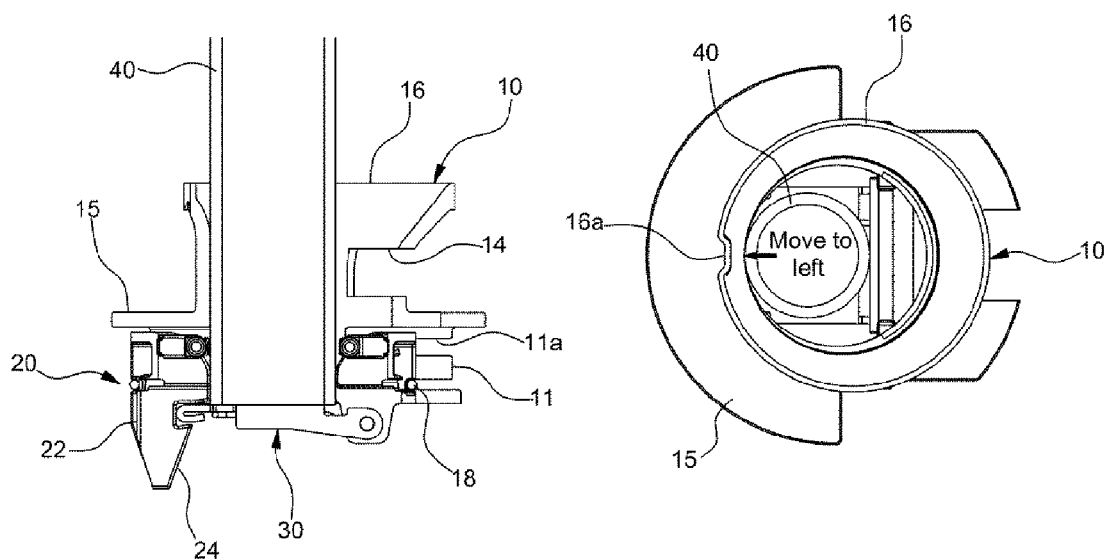
FIG. 7 is a cross-sectional view and a plan view showing a state in which the gasoline fuel gun is inserted obliquely to the left in the cross-sectional view of FIG. 3.
Figure 8:
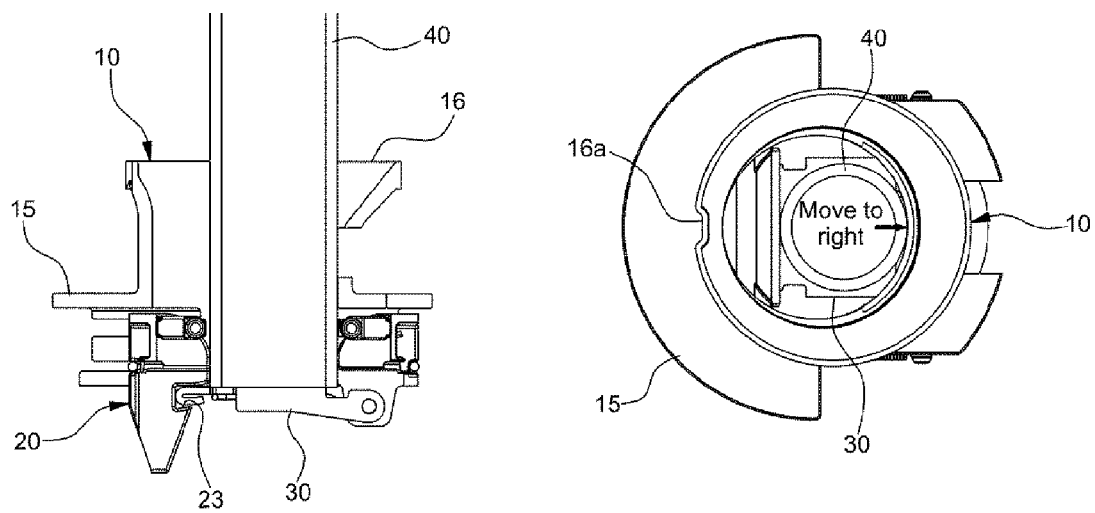
FIG. 8 is a cross-sectional view and a plan view showing a state in which the gasoline fuel gun is inserted obliquely to the right in the cross-sectional view of FIG. 3.

FIG. 7 is a cross-sectional view and a plan view showing a state in which the gasoline fuel gun is inserted obliquely to the left in the cross-sectional view of FIG. 3, and FIG. 8 is a cross-sectional view and a plan view showing a state in which the gasoline fuel gun is inserted obliquely to the right in the cross-sectional view of FIG. 3.

Referring to FIGS. 7 and 8, even when the gasoline fuel gun 40 is inserted obliquely to one of upper, lower, left and right sides (based on the plan view) and presses one of the sliding projections 20, one of the sliding projections 20 moves laterally, and the other sliding projection 20 is moved toward the one of the sliding projections 20 by the elastic restoring force of the springs 13. As a result, the flapper 30 is not opened by the stopper 23, and thus the fuel gun is prevented from being inserted.

Figure 9:
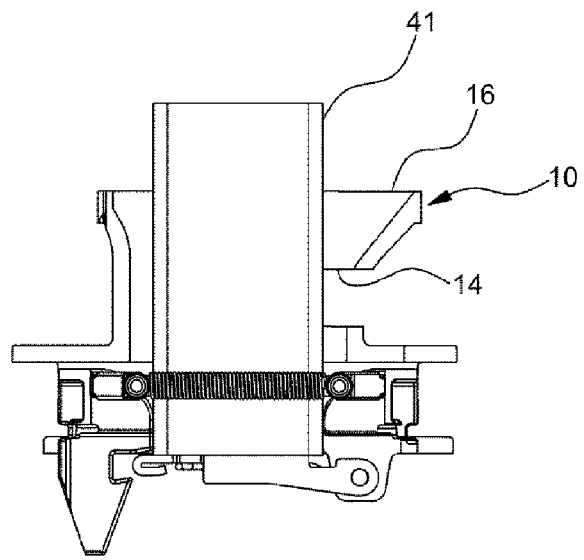
FIG. 9 is a cross-sectional view showing a state in which a diesel fuel gun is inserted into the center of a housing in the cross-sectional view of FIG. 3.

FIG. 9 is a cross-sectional view showing a state in which a diesel fuel gun is inserted into the center of a housing in the cross-sectional view of FIG. 3.

(2) When the diesel fuel gun 41 is inserted into the center of the housing 10, if the lower end of the fuel gun presses down the inclined surfaces of the sliding portions 21 of the sliding projections 20, the sliding projections 20 slide laterally and are opened, and the fuel gun passes through the sliding portions 21 and reaches the flapper 30.

At this time, the sliding portions 21 of the sliding projections 20 are maintained at the same interval as the outer diameter of the fuel gun by the elastic restoring force of the springs 13, which connect the sliding projections 20, and tightened in contact with the outer surface of the fuel gun.

However, since the diameter of the diesel fuel gun 41 is greater than that of the gasoline fuel gun 40, the opening degree of the sliding projections 20 is increased, and thus the end of the flapper 30 is removed from the stopper 23, allowing the flapper 30 to be freely rotated and opened.

This is the same when the diesel fuel gun 41 is inserted obliquely in one direction from the central axis of the housing 10.

Figure 10:
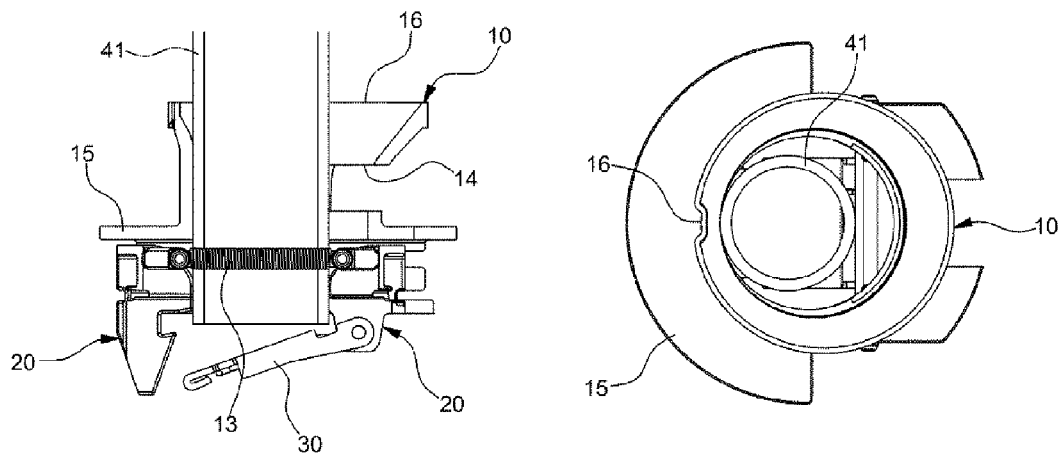
FIG. 10 is a cross-sectional view and a plan view showing a state in which the diesel fuel gun is inserted obliquely to the left of the housing in the cross-sectional view of FIG. 3.

FIG. 10 is a cross-sectional view and a plan view showing a state in which the diesel fuel gun is inserted obliquely to the left of the housing in the cross-sectional view of FIG. 3.

In this case, when fuel is supplied through the fuel filler neck of the diesel vehicle using the diesel fuel gun 41, the fuel gun can be inserted into the fuel filler neck.

Figure 11:
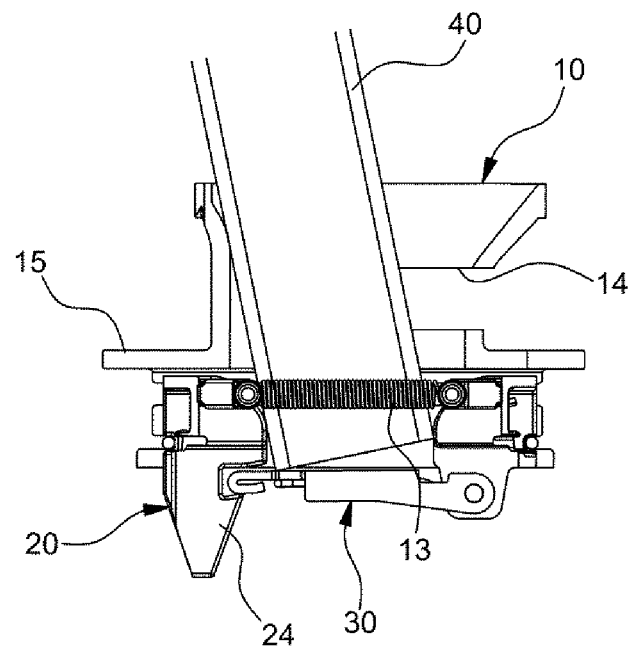
FIG. 11 is a cross-sectional view and a plan view showing a state in which the gasoline fuel gun is inserted obliquely in the cross-sectional view of FIG. 3.

FIG. 11 is a cross-sectional view and a plan view showing a state in which the gasoline fuel gun is inserted obliquely in the cross-sectional view of FIG. 3.

(3) Even when the gasoline fuel gun 40 is inserted obliquely from the central axis of the housing 10, it is possible to prevent the flapper 30 from being released from the stopper 23.

For example, even when a fuel gun of the same diameter is inserted, the interval between the sliding projections 20 moving horizontally when the fuel gun is inserted obliquely is greater than that when the fuel gun is inserted into the center of the housing 10, and thus the flapper 30 may be removed from the stopper 23.

However, the edge at the lower end of the sliding portion 21 of the sliding projection 20 according to the present invention is formed into a round shape, and thus when the fuel gun is inserted obliquely from the central axis of the housing 10, the sliding projections 20 are opened the same distance as the outer diameter of the fuel gun inserted into the center of the housing 10, thus maintaining the flapper 30 locked by the stopper 23.

Figure 12:
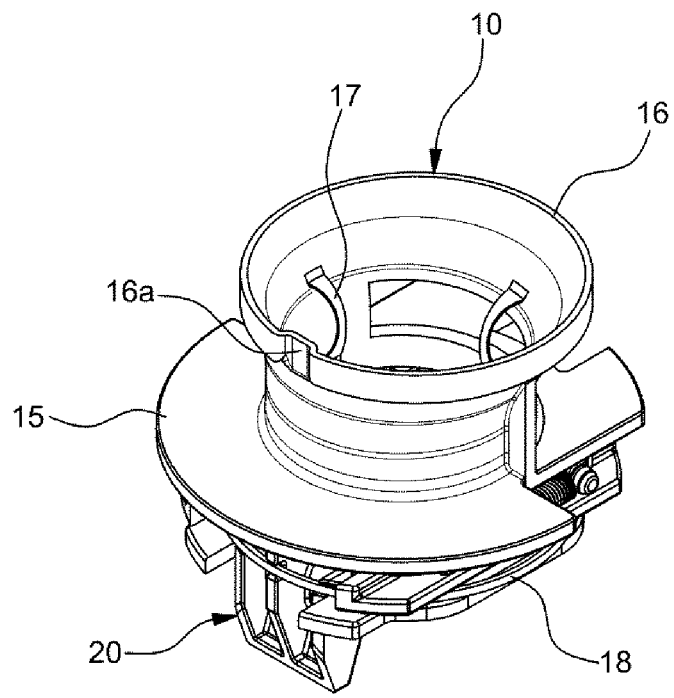
FIG. 12 is a perspective view showing an exemplary state in which a plate spring is installed in an anti-misfueling filler neck in accordance with the present invention.

FIG. 12 is a perspective view showing a state in which a plate spring is installed in an anti-misfueling filler neck in accordance with various embodiments of the present invention.

In various embodiments of the present invention, plate springs 17 are provided at regular intervals in the circumferential direction to guide the gasoline fuel gun 40, which is inserted obliquely from the central axis of the housing 10, to be inserted into the center of the housing 10.

Each plate spring 17 has a semi-circular plate structure with a narrow width and a long length. These semi-circular plate springs 17 are arranged axially on the inner surface of the housing 10 in such a manner that both ends of each plate spring 17 is fixed on the inner circumferential surface of the housing 10 and a middle portion of each plate spring 17 projects inwardly from the housing 10.

Therefore, even when a fuel gun having a diameter smaller than the internal diameter of the housing 10 is inserted obliquely, the fuel gun is erected in the central axial direction of the housing 10, thus preventing the flapper 30 from being opened.

As described above, the anti-misfueling filler neck device according to the present invention has the following advantages.

Firstly, the sliding projections are mounted in the housing so as to move laterally on the lower side of the housing, and the sliding projections which move horizontally are connected by means of the springs. Therefore, when the gasoline fuel gun with a relatively small diameter is inserted into the fuel inlet of the diesel vehicle, the sliding projections are moved the same distance as the outer diameter of the gasoline fuel gun and in contact with the fuel gun, and thus the flapper is maintained in its closed state by the stopper. Moreover, when the diesel fuel gun with a relative large diameter is inserted, the sliding projections are moved the same distance as the outer diameter of the diesel fuel gun and in contact with the fuel gun, and thus the flapper is released from the stopper. As a result, the flapper is opened only when the diesel fuel gun is inserted, thus preventing gasoline from being supplied through the fuel inlet of the diesel vehicle.

Secondly, the edges of the sliding projections, which are in contact with the fuel gun, are formed into a round shape such that the opening degree of the sliding projections is minimized even when the gasoline fuel gun is inserted obliquely, and thus the flapper is maintained in its closed state by the stopper.

Thirdly, the semi-circular plate springs are provided in the housing such that even when the gasoline fuel gun is inserted obliquely, the fuel gun is erected in the central axial direction of the housing by the plate springs, thus preventing the flapper from being released from the stopper due to the oblique insertion of the fuel gun.

For convenience in explanation and accurate definition in the appended claims, the terms upper or lower, rear, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An anti-misfueling filler neck device configured to prevent different types of fuel from being supplied, the anti-misfueling filler neck device comprising:
   a housing into which a fuel gun is inserted;
   sliding projections mounted at the bottom of the housing so as to slide laterally and face each other;
   springs interconnecting the sliding projections horizontally to elastically support the sliding projections;
   a stopper including a locking groove and formed on one of the sliding projections; and
   a flapper having a hinge structure and rotatably mounted on the other sliding projection to open and close a lower opening of the housing,
   wherein when a fuel gun having a relatively small diameter is inserted while the flapper is locked and closed by the locking groove of the stopper, the sliding projections are tightened by the springs such that the flapper is maintained in the closed state, and when a fuel gun having a relatively large diameter is inserted, the sliding projections are opened more widely than the length of the flapper such that the flapper is released from the stopper and opened.

2. The anti-misfueling filler neck device of claim 1, wherein the flapper is rotated to its original position by a torsion spring and is opened only when a diesel fuel gun is inserted.

3. The anti-misfueling filler neck device of claim 1, wherein the stopper is in the form of a locking groove with a C-shaped cross-section, and is formed on a lower end of the sliding projection and a tapered portion is formed to be inclined downwardly from an inlet end of the stopper such that the flapper is rotated to its original position and inserted and locked into the stopper.

4. The anti-misfueling filler neck device of claim 1, wherein the sliding projection comprises horizontal wing portions formed in parallel to project laterally from both sides of the sling projection, the horizontal wing portions being inserted into guide grooves formed horizontally on the side of the housing to guide the horizontal movement of the sliding projection.

5. The anti-misfueling filler neck device of claim 4, wherein the horizontal wing portions of the sling projection have flat upper and lower surfaces and are prevented from being rotated when they are moved along the guide grooves of the housing.

6. The anti-misfueling filler neck device of claim 1, wherein the housing comprises side plates formed in parallel to project laterally from both sides of the bottom of the housing and the guide grooves formed horizontally on the side plates, thus guiding the horizontal movement of the sliding projections.

7. The anti-misfueling filler neck device of claim 1, wherein the sliding projection comprises an sliding portion including a substantially right-angled triangular cross-section on the top of the sliding projection and has a round edge in contact with the fuel gun such that the interval between the sliding projections is minimized even when the fuel gun is inserted obliquely, thus preventing the flapper from being released from the locking groove of the stopper.

8. The anti-misfueling filler neck device of claim 1, the housing comprises semi-circular plate springs arranged axially on the inside of the housing, thus preventing the flapper from being opened when the fuel gun is inserted obliquely.

9. The anti-misfueling filler neck device of claim 1, wherein the housing comprises an inlet portion including a diameter that increases toward the top of the housing and is formed at an upper end of the housing, and thus the housing has an integrated structure with a retainer.

10. The anti-misfueling filler neck device of claim 9, wherein one side of the inlet portion of the housing is biased from the central axis of the housing and has a large opening area, and an air vent hole is formed on one side the biased inlet portion, thus easily discharging air to the outside during fueling.

11. The anti-misfueling filler neck device of claim 1, wherein the housing comprises a position regulation groove formed on one side of an upper edge of the housing, thereby preventing misassembling of the housing.

12. The anti-misfueling filler neck device of claim 1, further comprising a case including a fuel inlet, mounted on a vehicle body and into which the fuel gun is installed, and a fuel pipe detachably connected to a lower end of the fuel inlet, wherein the housing is supported between a flange portion formed at a lower end of the fuel inlet and a flange portion formed at an upper end of the fuel pipe using a side support plate projecting from the side of the housing.

13. The anti-misfueling filler neck device of claim 1, wherein the rear side of the sliding projection is in the form of a circular curved shape with a constant curvature so as to minimize the size of the case surrounding the housing, the sliding projections, and the flapper.

14. The anti-misfueling filler neck device of claim 1, further comprising an elastic ring mounted to surround the sliding projections at both sides and the outer surface of the housing such that the sliding projections are located in the center of the housing when the fuel gun is removed from the fuel inlet.

* * * * *